Dec. 3, 1929.  A. E. ANDERSON  1,738,344
CONTROL SYSTEM
Filed April 14, 1928
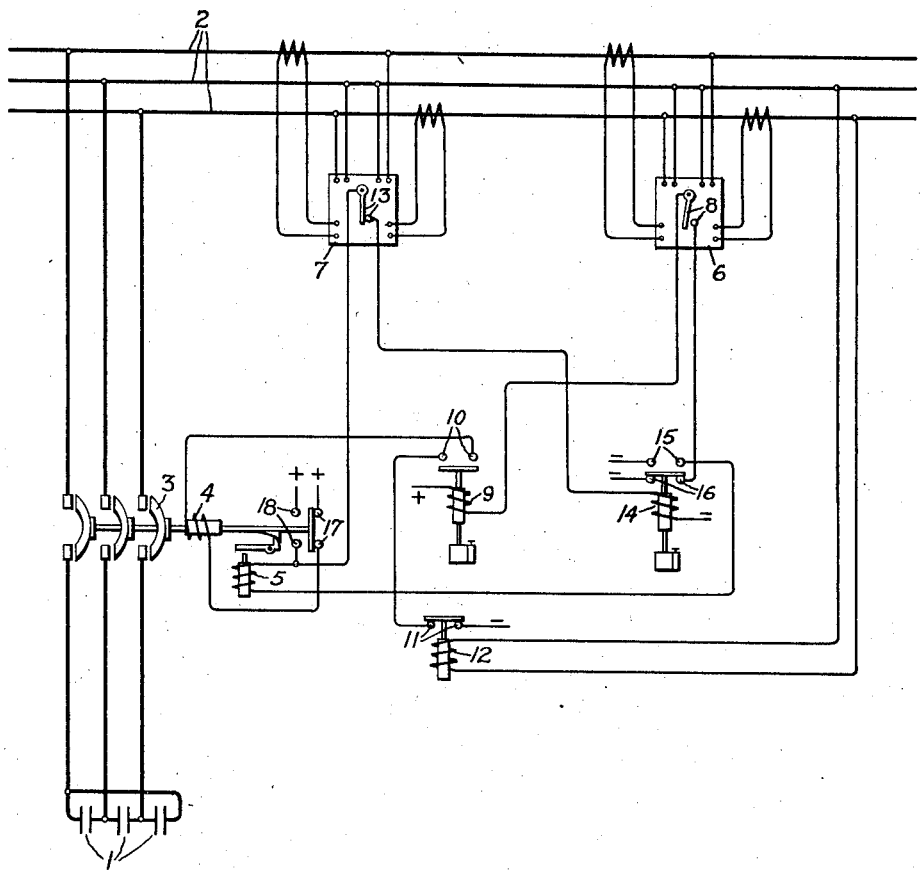
Inventor:
Arvid. E. Anderson,
by Charles E. Tullar
His Attorney.

Patented Dec. 3, 1929

1,738,344

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

CONTROL SYSTEM

Application filed April 14, 1928. Serial No. 270,137.

My invention relates to control systems and particularly to a system for controlling the connection of a capacitor to an alternating current circuit and its object is to provide an improved automatic control arrangement for controlling the connections between an alternating current circuit and a capacitor in response to predetermined electrical conditions of the circuit.

In accordance with my invention I provide an arrangement for effecting the automatic connection of the capacitor to a load circuit only when the power factor of the circuit is of a predetermined character and voltage of the load circuit is below a predetermined value, because in systems of electric distribution in which capacitors are used to control the power factor there is very little need of connecting the capacitor to the system to correct the power factor under light load normal voltage conditions although the power factor may be low. The disconnection of the capacitor is effected in response to the power factor and independently of the voltage of the load circuit.

My invention will be better understood from the following description taken in connection with the accompanying drawing and its scope will be pointed out in the appended claims.

Referring to the accompanying drawing, which diagrammatically shows an arrangement embodying my invention, 1 represents a bank of capacitors which is adapted to be connected across an alternating current circuit 2 by means of a circuit breaker 3 which may be of any suitable type examples of which are well known in the art. As shown the circuit breaker 3 is of the well known latched-in type and is provided with a closing coil 4, and trip coil 5.

For controlling the closing and opening of the circuit breaker automatically in response to the power factor of the circuit I provide two power factor relays 6 and 7 which may be of any suitable construction, examples of which are well known in the art. These relays are connected to the circuit 2 in any suitable manner so as to be responsive to the power factor thereof. The relay 6 is arranged to effect the closing of the circuit breaker 3 when the power factor of the circuit 2 is of a predetermined character, such for example as when the power factor is 0.9 or less lagging, for a predetermined time. As shown the power factor relay 6, when it closes its contacts 8, effects the energization of a time delay relay 9 which in turn effects the closing of contacts 10 in the circuit of the closing coil 4. The circuit of the closing coil 4 also includes contacts 11 of a voltage responsive relay 12 connected across the circuit 2. The contacts 11 are arranged to be closed only when circuit voltage is below a predetermined value so that the power factor has to be a predetermined character and at the same time the voltage of the circuit 2 has to be below a predetermined value in order to effect the connection of the capacitor thereto.

The power factor relay 7 is arranged to effect the opening of the circuit breaker 3 when the power factor of the circuit 2 is of a predetermined character for a predetermined time such for example as 0.9 or less, leading. As shown the proper factor relay 7, when its contacts 13 are closed, effects the energization of a time delay relay 14 when the circuit breaker 3 is closed. The time delay relay 14 in turn effects, after it has been energized a predetermined time, the closing of contacts 15 in the circuit of the trip coil 5 and the opening of contacts 16 in the circuit of the time delay relay 9 so that if for any reason the contacts of both power factor relays should be closed simultaneously both the trip coil 5 and the closing coil 4 cannot be energized simultaneously.

The operation of the arrangement shown is as follows: It will be assumed that the circuit breaker 3 is open and that the power factor of the circuit 2 becomes sufficiently lagging to cause the power factor relay 6 to close its contacts 8 thereby completing a circuit for the time relay 9. This circuit also includes contacts 16 of time delay relay 14 which are closed at this time. After the time delay relay 9 has been energized a predetermined time it closes its contacts 10 and thereby completes a circuit for the closing coil 4 if the voltage of the circuit 2 is also below a pretermined value so that the contacts of the relay 12 are closed. The circuit of the closing coil 4 also includes auxiliary contacts 17 on the circuit breaker 3 which are closed when the circuit breaker is open. The energization of the closing coil 4 effects the closing of the circuit breaker 3 so that the bank of capacitors 1 is connected across the circuit 2.

The capacitors remain connected across the circuit 2 until the power factor of the circuit is of such a character as to cause the power factor relay 7 to close its contacts 13 in the circuit of the time delay relay 14. This circuit also includes auxiliary contacts 18 on the circuit breaker 3 which are closed only when the circuit breaker 3 is closed. After the time delay relay 14 has been energized for a predetermined time, it opens its contacts 16 and closes its contacts 15. The closing of contacts 15 completes a circuit for the trip coil 5 through auxiliary contacts 18 on the circuit breaker 3. The energization of the trip coil 5 effects the opening of the circuit breaker 3 and the disconnection of the bank of capacitors 1.

It will be noted that the tripping of the circuit breaker 3 is effected in response to the power factor of the circuit 2 and independently of the value of the voltage across the circuit, whereas the closing of the circuit breaker is effected only when the power factor is of a predetermined character and at the same time the circuit voltage is below a predetermined value.

While I have in accordance with the Patent Statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desired to secure by Letters Patent of the United States is:—

1. In combination, an alternating current circuit, a capacitor, switching means for connecting said capacitor across said circuit, means responsive to the power factor of said circuit, and means responsive to the voltage of said circuit and cooperating with said power factor responsive means to effect the operation of said switching means only when the voltage of said circuit is below a predetermined value and the power factor is of a predetermined character.

2. In combination, an alternating current circuit, a capacitor, switching means for connecting said capacitor across said circuit, and means including means responsive to the power factor of said circuit and means responsive to the voltage of said circuit for effecting the operation of said switching means to connect said capacitor across said circuit only when the voltage of said circuit is below a predetermined value and the power factor is of a predetermined character and for effecting the disconnection of said capacitor from said circuit in response to a different power factor of said circuit and independently of the voltage thereof.

3. In combination, an alternating current circuit, a capacitor, switching means for connecting said capacitor across said circuit, means responsive to the power factor and voltage of said circuit for effecting the operation of said switching means to connect said capacitor across said circuit only when the power factor is lagging and less than a predetermined amount and the voltage of said circuit is at the same time less than a predetermined amount, and means responsive to the power factor of said circuit for effecting the operation of said switching means to disconnect said capacitor from said circuit when the power factor is leading and less than a predetermined amount.

4. In combination, an alternating current circuit, a capacitor, switching means for connecting said capacitor across said circuit having a closing coil and a trip coil, a power factor responsive device and a voltage responsive device connected to said circuit and jointly co-operating to control the energization of said closing coil, and another power factor responsive device connected to said circuit and arranged to control the energization of said trip coil independently of said voltage responsive device.

In witness whereof, I have hereunto set my hand this 10th day of April, 1928.

ARVID E. ANDERSON.